United States Patent [19]
Haven
[11] 3,875,534
[45] Apr. 1, 1975

[54] TECHNIQUE TO PCM HIGH POWER LASERS

[75] Inventor: Roger Lindsy Haven, Denville, N.J.
[73] Assignee: The United States of America as represented by the Secretary of the Army, Washington, D.C.

[22] Filed: Oct. 26, 1973
[21] Appl. No.: 410,053

[52] U.S. Cl. .......... 332/7.51, 331/94.5 A, 250/344, 340/190, 340/347
[51] Int. Cl. .......... H01s 3/10
[58] Field of Search .......... 332/7.51; 331/94.5 A; 250/199, 339, 344, 355; 340/173 LT, 181, 184, 190, 347 AD, 347 DR

[56] References Cited
UNITED STATES PATENTS

| | | | |
|---|---|---|---|
| 3,461,384 | 8/1969 | Bayati et al. | 250/199 |
| 3,541,468 | 11/1970 | Hammond et al. | 331/94.5 |
| 3,727,061 | 4/1973 | Dworkin | 250/199 |

*Primary Examiner*—Maynard R. Wilbur
*Assistant Examiner*—N. Moskowitz
*Attorney, Agent, or Firm*—Lawrence A. Neureither; Joseph H. Beumer; Robert C. Sims

[57] ABSTRACT

The high powered lasers are pulse code modulated in accordance with an analog signal. A delta modulator breaks the analog signal into a series of digital information. This information is fed to an information transformer which has a plurality of output channels each of which feed a power switching network for one of the plurality of lasers. The lasers produce discrete optical outputs in sequence in accordance with the digital information. These outputs can be individually transmitted to a receiver and acted upon both at the transmitted end and the receiving end so as to code the information obtained in the system. The transmitter end would code it and the receiver end would decode the information. The signals could also be combined at the transmitter end and sent along a single path to the receiver. The lasers' outputs could also be sent into space to a target for reflection therefrom. A receiver is provided to detect the reflected laser beam energy and feed it to a matched filter ranging scheme.

6 Claims, 15 Drawing Figures

TECHNIQUE TO PCM HIGH POWER LASERS

BACKGROUND OF THE INVENTION

The present invention is related to the field of communications. An example of prior art in this field is U.S. Pat. No. 3,675,049, issued July 4, 1972, to applicant. This patent shows a device for delaying the bits of a serial data stream by a plurality of delay channels and combining the outputs of the plurality of data channels into a single receiver. The device does this without the use of optical generating means.

SUMMARY OF THE INVENTION

The present invention takes an analog input signal and feeds it to a delta modulator which converts the analog into a digital signal with a series format. This digital signal information is fed to an information transformer which sequentially applies the digital ones to its plurality of output channels. A plurality of lasers each having a power input and a power switching device for the firing of the laser are connected in an array. The power switching device of each of the lasers is connected to one of the output channels of the information transformer for activation thereby. When the laser is activated, it produces a discrete optical output of high power and short duration. This optical output is the equivalent of a digital one. The information transformer is such that upon receipt of a digital zero, none of the output channels will be activated.

From this point the plurality of laser's discrete optical outputs (which represent the digital information) may be acted upon in different ways. First by the use of reflecting means in the path of each of the beams, they could be reflected by a beam directing system containing these reflecting means so that the outputs would follow a single beam path to a receiver. The receiver would consist of a single low noise optical detector whose output would be the digital information. This can be amplified, decoded, and converted back to the analog signal which, in the absence of noise, would be the same as the analog signal input.

However, the transmission paths of the laser beams need not be the same. This requires a plurality of receivers to detect the information of each individual laser. These receivers sent their outputs through a plurality of delay means to adjust for any difference in the transmission paths and then sent on to an OR gate. The output of the OR gate would combine all of the information of the lasers and, therefore, would be equal to the digital information fed into the information transformer. This output can be converted by an digital-to-analog converter to regain the original analog signal.

To provide a secure communication system, a plurality of variable digital delay units will be interposed between the information transformer and the triggers of the power switching devices involved with the individual lasers. These variable digital delay units are programmed by a command generator at the transmission line, and at the receiver line the receivers contain a plurality of variable delay units which are inversely programmed by a delay command generator. Then the outputs are sent to an OR gate for combining the signals in the manner set forth above.

The transmitter end could also contain decoding means to invert the digital laser information into analog electrical information. This could be sent by a plurality of telephone lines to the receiver end which has an inverse setup compared to the transmitter end.

The plurality of laser outputs could also be used as an optical radar array. In this case the information fed to the information transformer is information that is repeated so that it would be periodic. An optical detector is provided to sense reflected energy from the target, and its output is sent to a range bin correlator unit. The periodic digital signal is also sent through a variable delay unit to a tapped delay line. The range bin correlator unit comprises a plurality of discrete correlator units; each connected to a different tap on the tap delay line. When there is a coincidence of information one of the discrete correlator units will produce an output which is sensed by a range bin indicator.

DESCRIPTION OF THE PREFERRED EMBODIMENTS

Figure 1:
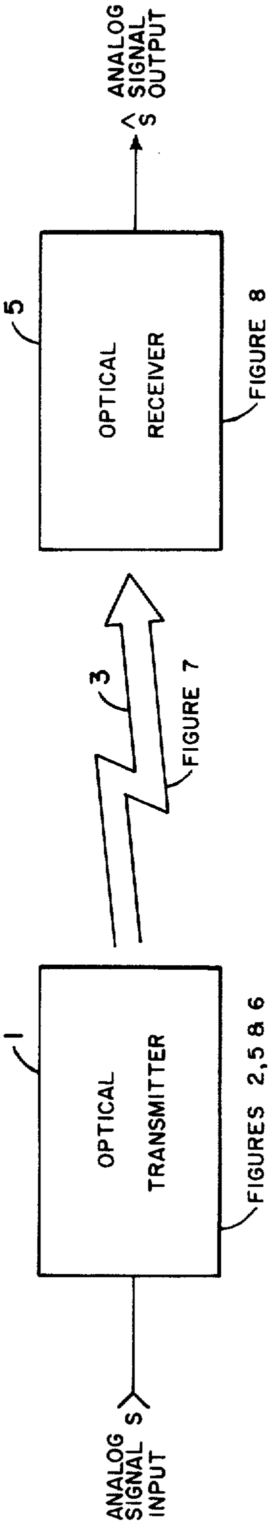
FIG. 1 is an overall block diagram showing the basic invention.

FIG. 1 presents a basic functional block diagram of the Pulse Code Modulated (PCM) high powered laser system. Here, the analog signal input S is presented to the optical transmitter 1. At the transmitter the analog signal is serial PCM encoded and power modulates a bank of high power lasers. The output of the laser bank is directed over a long distance optical path 3 to the optical receiver 5. At the receiver the detected PCM signal is amplified and decoded thus producing $\hat{S}$; a copy of the analog input signal S at its output.

Since highpower lasers do not have a very high duty cycle (on-to-off time ratio), this invention makes use of an information transformer (IXF) to obtain the highest average power from any given laser type.

Figure 2:
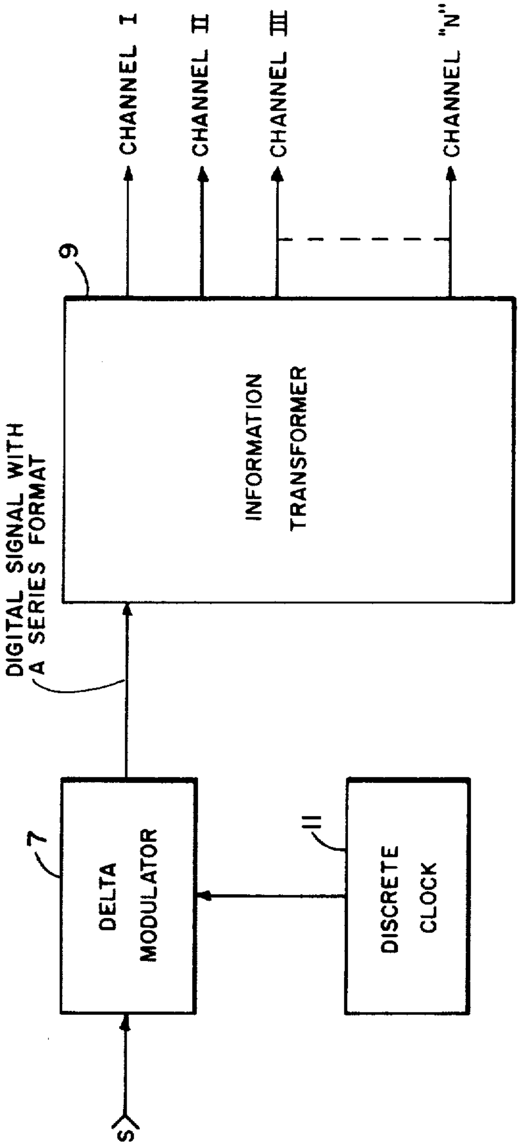
FIG. 2 is a block diagram showing the encoding and information transformer subsystem.
Figure 6:
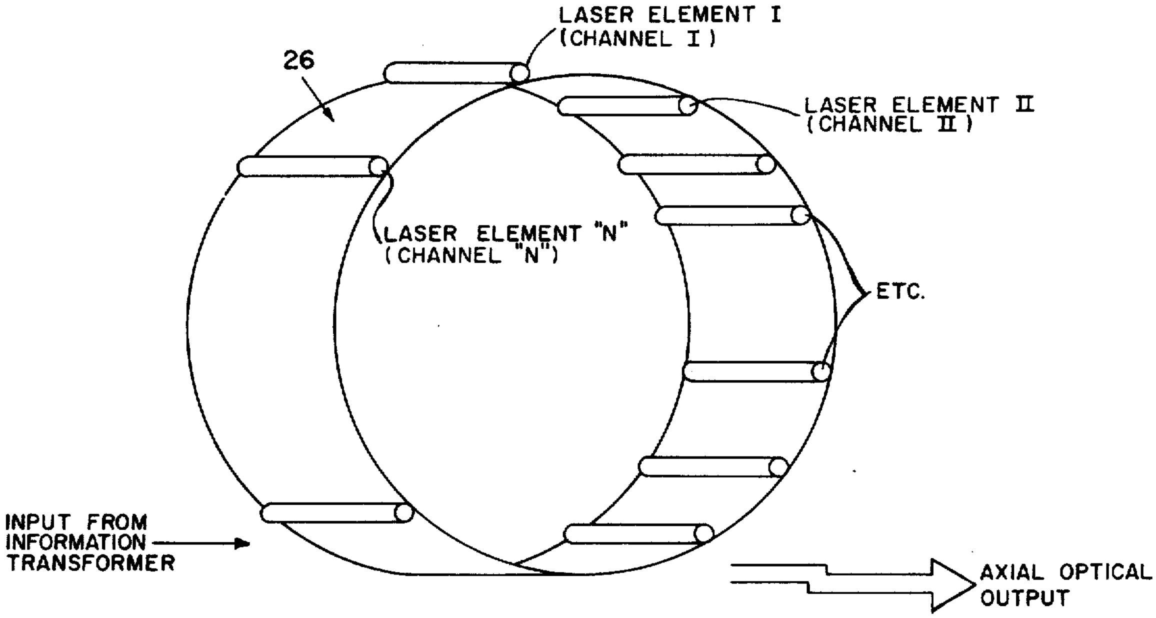
FIG. 6 is a diagrammatic showing of the axial beam laser array.
Figure 5:
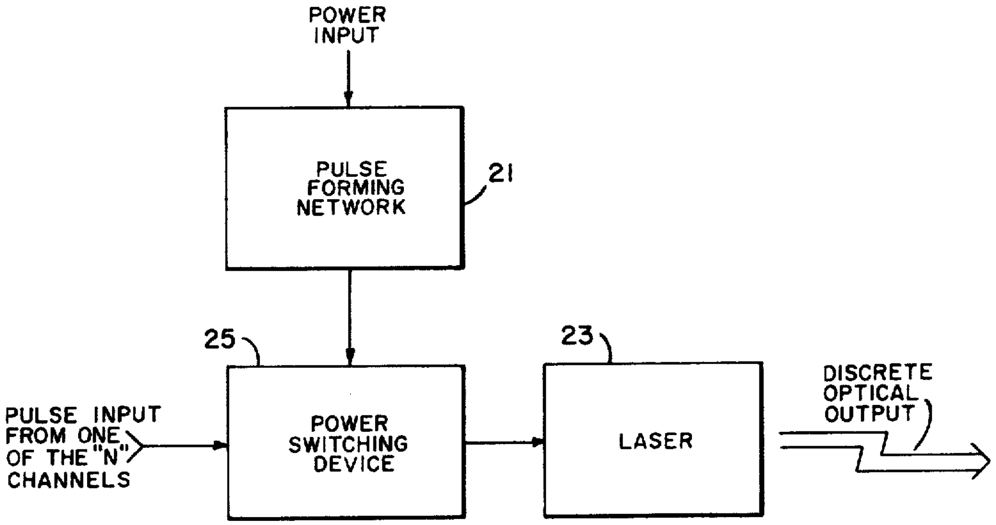
FIG. 5 is a block diagram showing a typical power modulated laser subsystem.

FIG. 2 shows the PCM encoding and the information transformation functions of the optical transmitter of FIG. 1, while FIG. 5 depicts a typical channel of the pulse power modulated laser element that is used to make-up the axial beam laser array shown in FIG. 6.

FIG. 2 shows the analog input signal S being presented to a delta modulator 7 where it is encoded into a PCM signal. This PCM signal has a serial format of digital "ones" and "zeros" and is called the DIGITS signal.

The DIGITS signal is presented to the information transformer 9 where the relatively high information input DIGITS signal is transformed into N output channels. Each channel consists of a lower information DIGITS signal. The information content of the input DIGITS signal is matched to the maximum bit rate of the laser which is, in turn, limited by its maximum duty cycle. A discrete clock 11 is provided to control the information flow rate. Any of the known delta modulators or analog-to-digital (series format) converters could be used for modulator 7.

Figure 3:
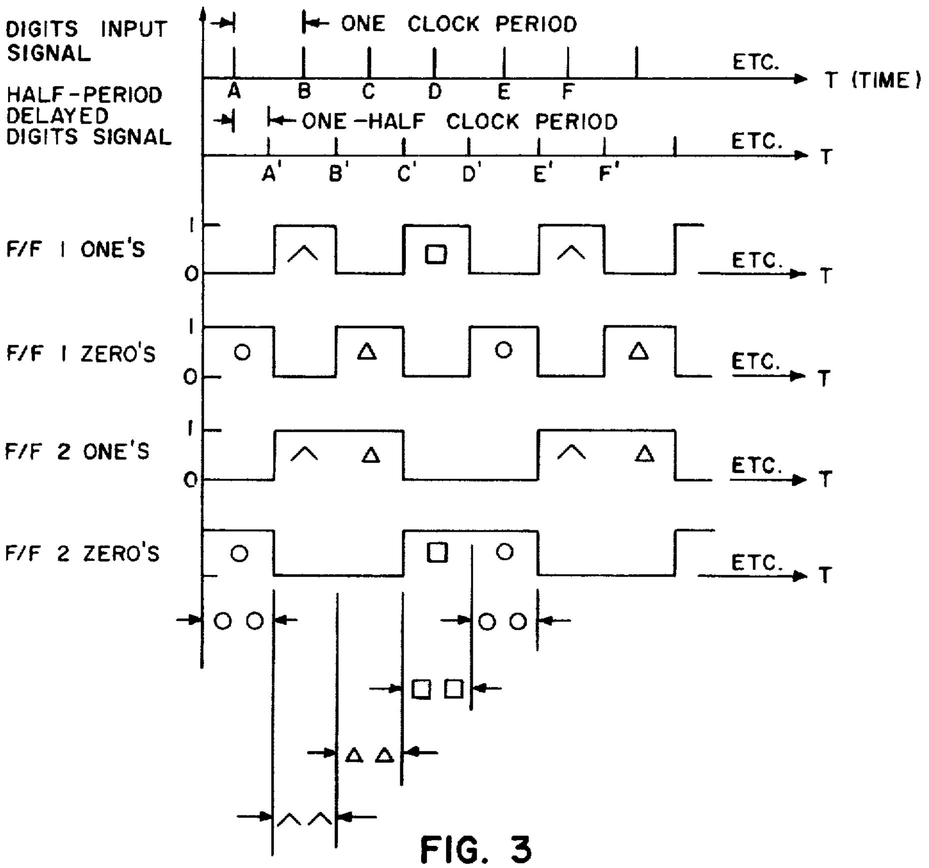
FIG. 3 is a showing of the wave shapes at various points of FIG. 4.
Figure 4:
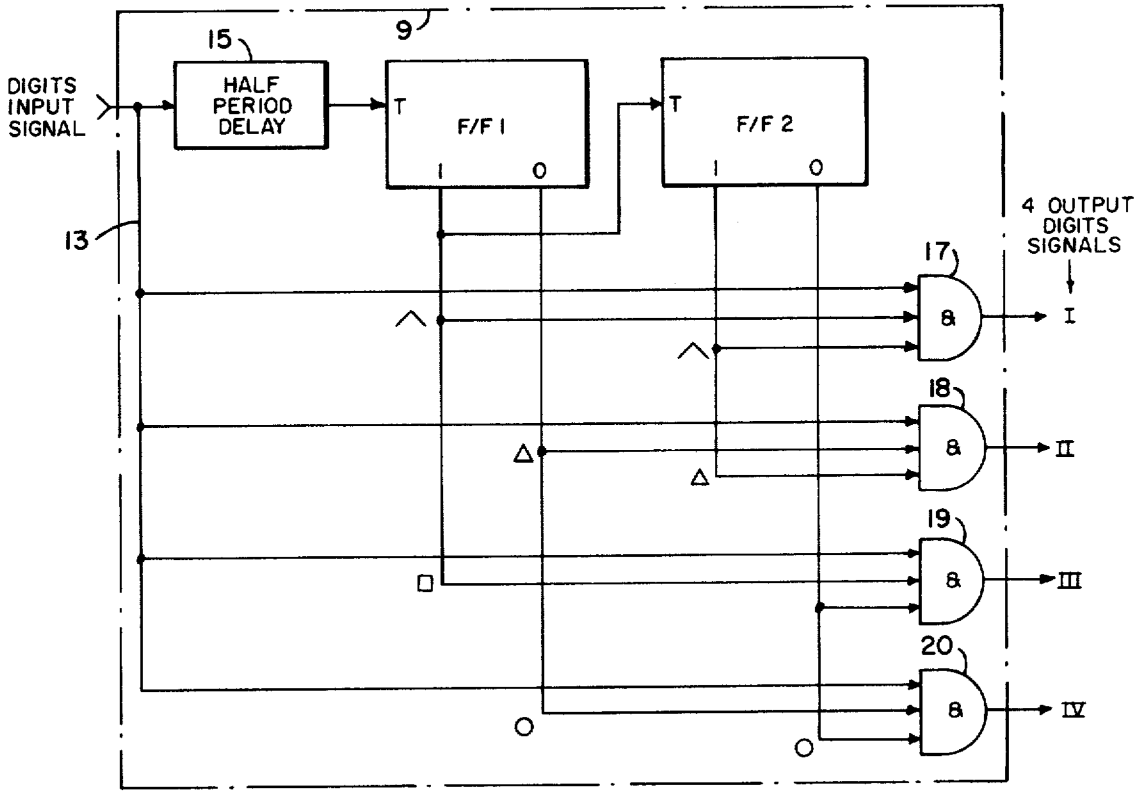
FIG. 4 is a more detailed block diagram of the information transformer.

FIGS. 3 and 4 display the graphics involved in this discussion. FIG. 3 presents a synchrogram of the wave shapes at various points within the information transformer. FIG. 4 presents a functional schematic of the information transformer 9. Please note that while the present discussion is concerned with a 1 by 4 information transformer for brevity, a high manifolding of this device is limited only by its requirements and economics.

FIG. 4 shows the input DIGITS signal entering the information transformer 9 from the upper-left. Inside the information transformer, the input DIGITS signal enters the input DIGITS signal BUS 13 and the half-period delay unit 15. This delay unit is a fixed noncritical delay designed to delay the input DIGITS signal by one-half clock period so as to set the F/Fs during non pulse time of the signal. The input DIGITS signal BUS 13 supplies one input of all the AND GATES 17–20. Consequently when an AND GATE is set to gate out a DIGITS signal pulse, it is not delayed by the information transformer. The remaining inputs of the AND GATES are supplied by the ONE, ZERO outputs of F/F 1 and F/F 2. (Where F/F is taken to means flip-flop.) F/F 1 and 2 make up a counter that counts the half-clock period delayed input DIGITS signal. Note that the F/F 1, F/F 2 counter's state determines which output I, II, III, or IV is connected exclusively to the input DIGITS signal BUS. To obtain more outputs, one adds further F/Fs (fed by the "one" of the F/F before it) and adds AND GATES with additional inputs connected in a counting fashion to all the F/Fs.

The synchrogram of FIG. 3 shows the events where the input DIGITS signal consists of a steady stream of ONE'S. Note that, if a ZERO comes along, the counter stops, that is, the information transformer stops and waits for the next ONE to come along. ΛΛ represents the signal to gate GATE 17, ΔΔ to gate GATE 18, etc.

In this way a 1 by 4 information transformer presents an output signal at each of its outputs with a maximum average bit rate equal to one-quarter of the average bit rate of its input signal. In a N channel system the maximum bit rate is cut by 1/N and the original stream can be reconstructed with a simple OR GATE.

FIG. 5 depicts a typical pulse power modulated laser element that would be embedded within the axial beam laser array shown in FIG. 6. The power input supplies energy to the pulse forming network 21 which is a finite energy storage device that will discretely power modulate the laser element 23 whenever the power switching device 25 receives an input pulse from the channel it is connected to.

There are N pulse power modulated laser elements required; one for each of the N outputs of the information transformer 9, see FIG. 2. These N laser elements are arranged in an axial array 26 such that their emitted beams form an axial set of beams, as is shown in FIG. 6.

Figure 7:
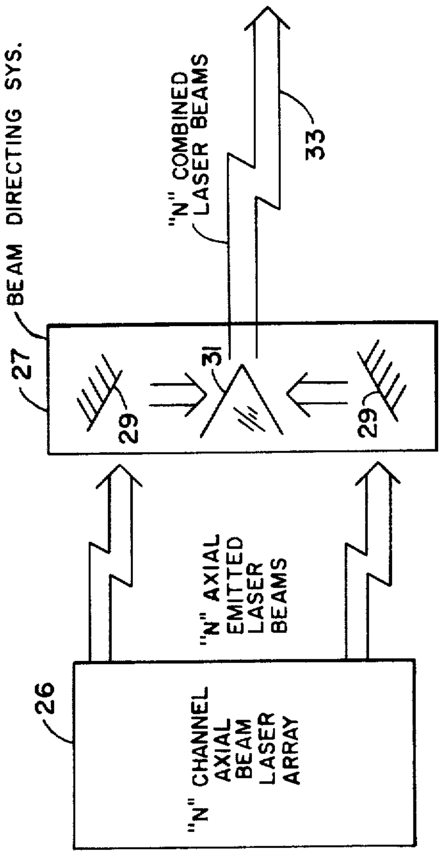
FIG. 7 is a block diagram showing the combined beam directing embodiment.

FIG. 7 shows the use of a beam directing system 27 to aid in long distance optical paths. In any event, a narrow-combined bundle of modulated high-power coherent optical energy is directed to a distant optical receiver. A frustum, truncated cone, type mirror 29 reflects the beams to a cone mirror 31 which reflects the beams along a single (or a narrow bundle) output path 33.

Figure 8:
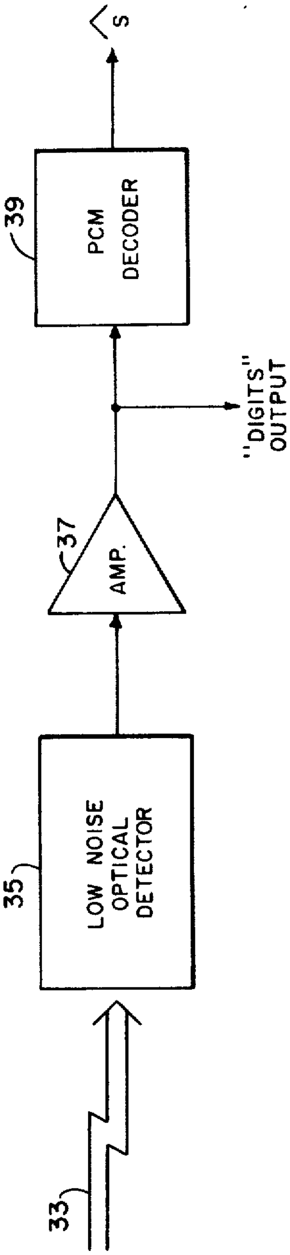
FIG. 8 is a block diagram showing the basic conception of the receiver of the invention.

FIG. 8 shows an optical receiver that receives the N combined laser beams via an optical transmission path. The low noise optical detector 35 receives the combined optical DIGITS signal and converts it to an electrical DIGITS signal. If this total process, from the output of the Δ-modulator unit (FIG. 2) to the output of the optical detector (FIG. 8) is considered to be noise and delay free, then the DIGITS signal at each of these points would be the same.

The optical detector's output DIGITS are amplified by amplifier 37 and decoded by decoder 39 to form an analog output signal. Note that the amplified DIGITS signal is also available as an output of the optical receiver. Detector 35 and PCM Decoder 39 may take shape of any of the known devices in the art.

Figure 9:
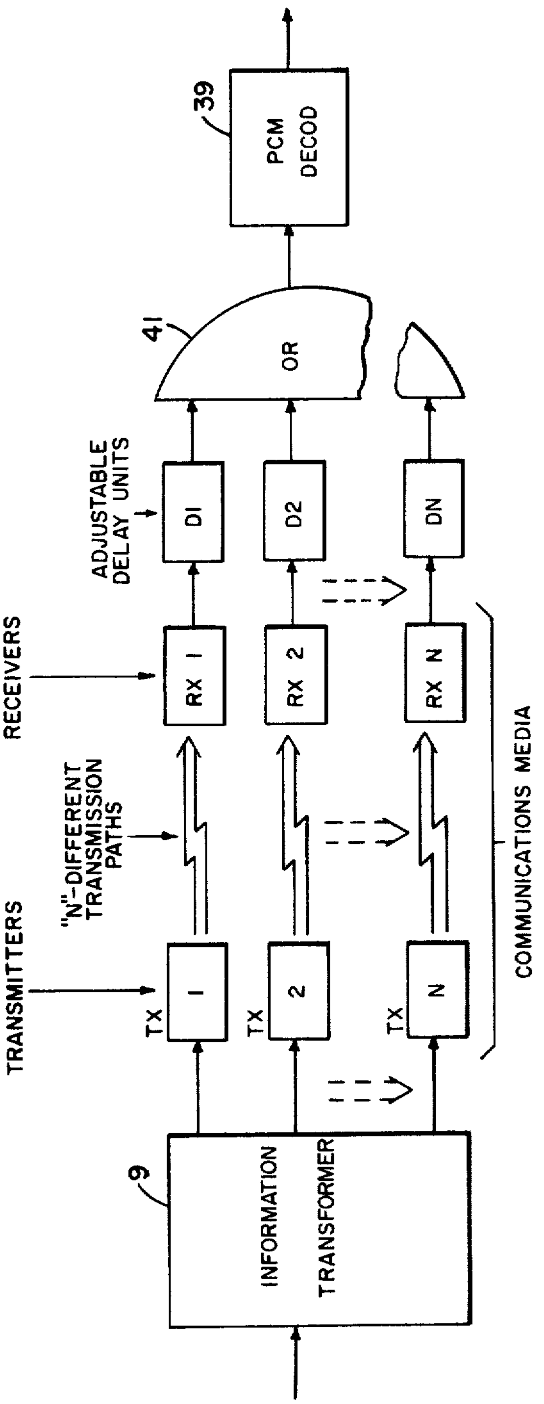
FIG. 9 is a block diagram showing a secure communications embodiment of the invention.

The diagram in FIG. 9 illustrates a basic secure communications system using N different transmission paths. The basic scheme is to generate N channels of information. Each channel never handles enough information to be useful to "outside" interceptors of any one or more channels. Along with this, the information transformer would be setup to allow the loss of a few channels and still have a working communications system. The transmitting TX1–N (lasers) transmit their beams over N different paths to receivers RX1–N. The receivers convert the beam information to electrical digits and send them to adjustable delay units D1-DN which are used to equalize the difference in transmission times of the various transmission paths. An OR GATE 41 is used to collect the delayed signals and send them to decoder 39. Decoder 39 is essentially the same as known (series format) digital-to-analog converters.

Figures 10, 13:
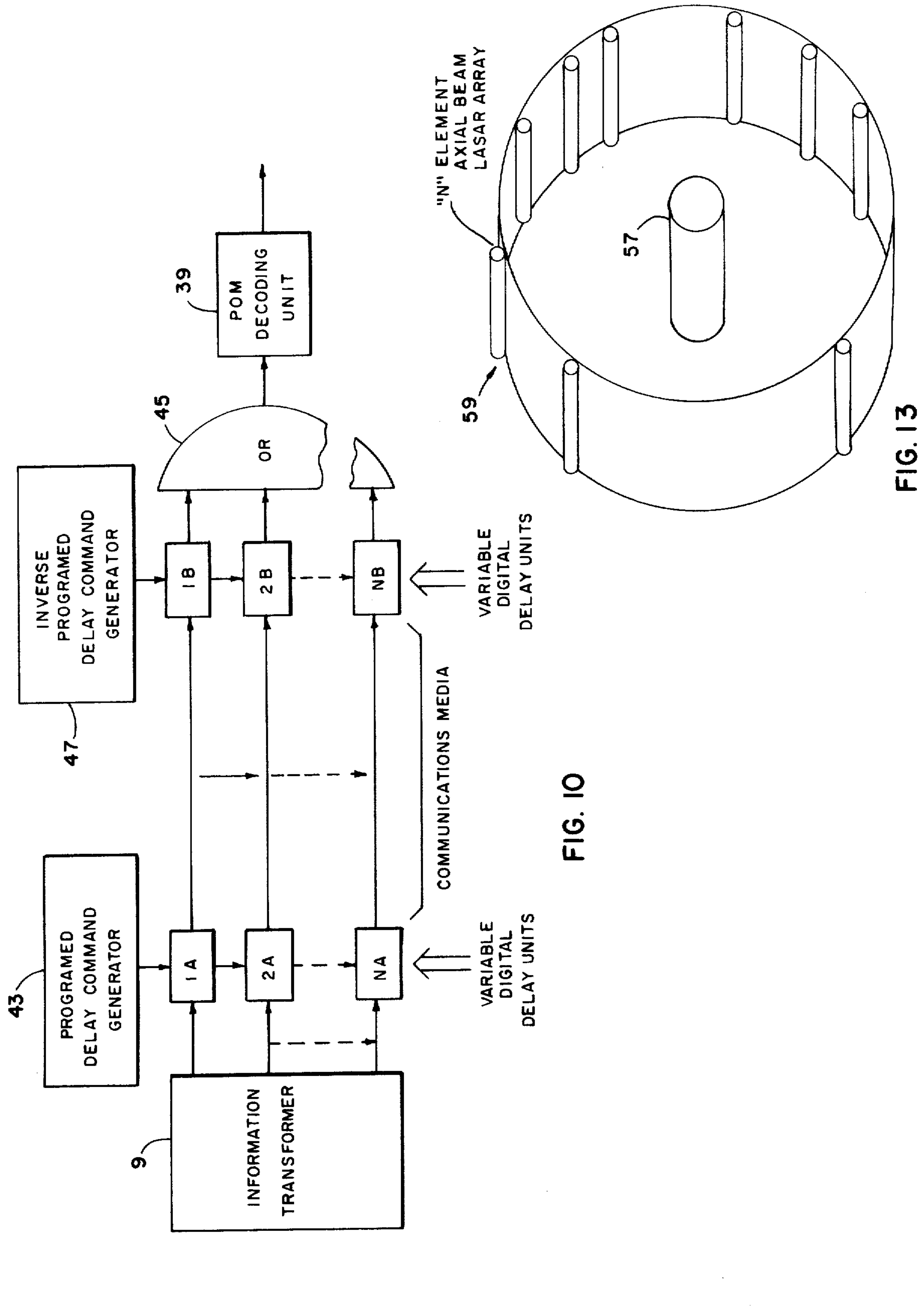
FIG. 10 is a block diagram showing a further secure communications embodiment of the present invention.
FIG. 13 is a diagrammatic showing of a laser array with the optical detector.

FIG. 10 illustrates a more sophisticated secure communications system (the details of the communications media has been omitted). Here, as in FIG. 9, the information transformer 9 produces N low information channels. These are fed to N variable digital delay units 1A-NA (VDD units). Each of the VDD units are programmed via a programmed delay command generator 43. After each of the N channels have experienced their "own" delay times, they are sent over a communications media. At the reception end, each of the N channels experience a complementary delay such that they arrive at the inputs of the OR GATE 45 in an orderly fashion. The OR GATE, in turn, feeds PCM decoder 39 which in turn produces the desired output. Generator 47 provides the program for delay units 1B-NB.

An interceptor must guess how many communication paths to intercept and what to do with them. To illustrate some of the above, assume that a secure system is using two channels. At some instant in time the Programmed delay command generators 43 and 47 are using a KEY delay time of ten seconds. At the transmission end assume that the 1A VDD unit is commanded to delay its low information DIGITS signal by five seconds and the 2A VDD unit is commanded to delay its low info DIGITS signal by seven seconds. At the reception end the delay command generator causes the complementary delays (using the KEY delay time of ten) to be experienced in both of the two channels. That is, the 1B VDD units delays its signal by 5 seconds and the 2B VDD unit to delay its signal by three seconds. Note that both signals arrive at the inputs of the OR GATE ten seconds after they leave the output of the informative transformer. Also note that the KEY delay time may be changed with different complements for each channel from time-to-time. Consequently the number of channels and the channel delay time scheduling make up the KEY to this secure communications system.

Figure 11:
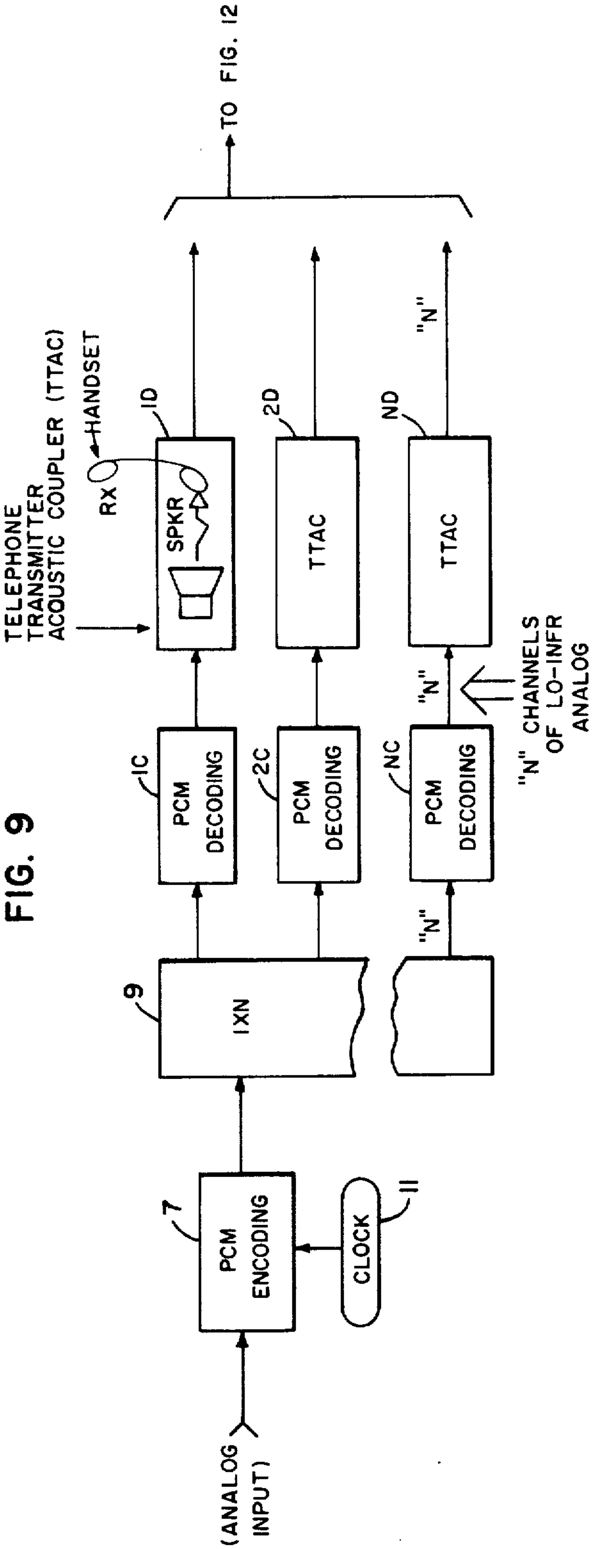
FIG. 11 is a block diagram showing the transmission end of a secure telephone communications embodiment of the present invention.
Figure 12:
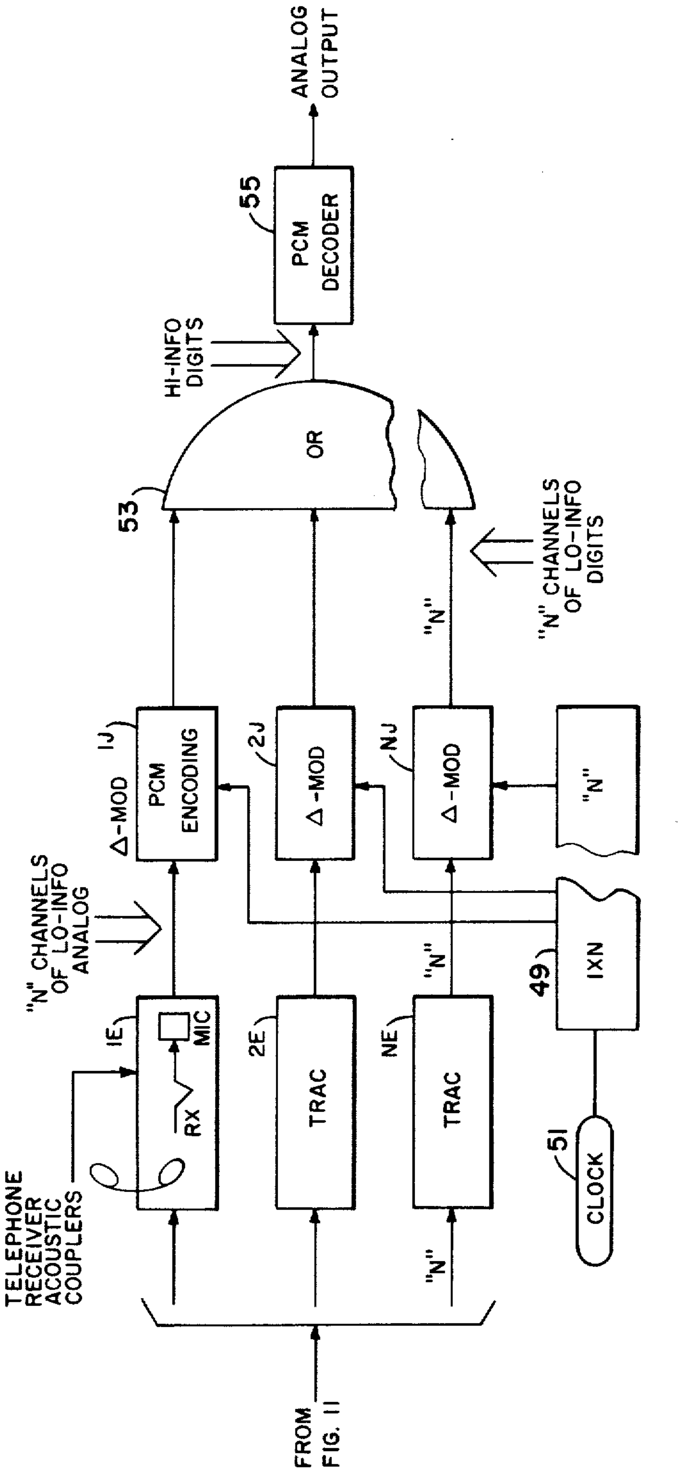
FIG. 12 is a block diagram showing the receiver end of a secure telephone communications embodiment of the present invention.

FIGS. 11 and 12 illustrate some of the secure communications techniques as applied to the telephone business. There are two parts: FIG. 11 illustrates the transmission end, while FIG. 12 illustrates the reception end. At the transmission end, the analog signal is PCM encoded by a deltamodulator 7 using a clock 11 of a given frequency. The high-info DIGITS signal is fed to the information transformerr 9, which makes N channels of low-info DIGITS. These N channels are fed to N PCM decoder units 1C-NC which in turn make N channels of low-info analog signals. These, in turn, are coupled to N telephone lines via N telephone transmitter acoustic couplers 1D-ND.

At the reception end (FIG. 12) the N telephone lines are fed to N telephone receiver acoustic couplers 1E-ND which feed modulators 1J-NJ, which converts the N channels of low info analog to N channels of low info digits. Note that each delta-modulator is fed its clock input via a 1XN information transformer 49 that is fed by clock 51 of the same frequency as that used by the transmission end. The N low info digits signals are reassembled by the OR GATE 53 into the high-info DIGITS signal which, in turn, decodes into an analog output signal by decoder 55.

The important point illustrated in FIGS. 11 and 12 is that the N low DIGITS signals can be decoded, converted into low-info analog signals, and sent via analog means. At the reception end, the N low-info analog signals can be encoded back into low-info DIGITS signals and reconstructed into a high-info digits signal via OR GATE 53. The delay coding of FIG. 10 can also be used to sophisticate this secure communications system.

FIG. 13 presents a diagram that is similar to that presented in FIG. 6. The difference lies in that the optical detector unit 57 that is mounted co-axially within the axial beam laser array. In the discussions involving the array of FIG. 6, it was assumed to be part of unidirectional communications system. If it is desired to have a two way system, such as, an Optical Detection and Ranging System (ODAR), then the array of FIG. 13 might be used. A beam directing system could also be used; however, it must be transparent along the coaxial optical detector's line of sight.

Figure 14:
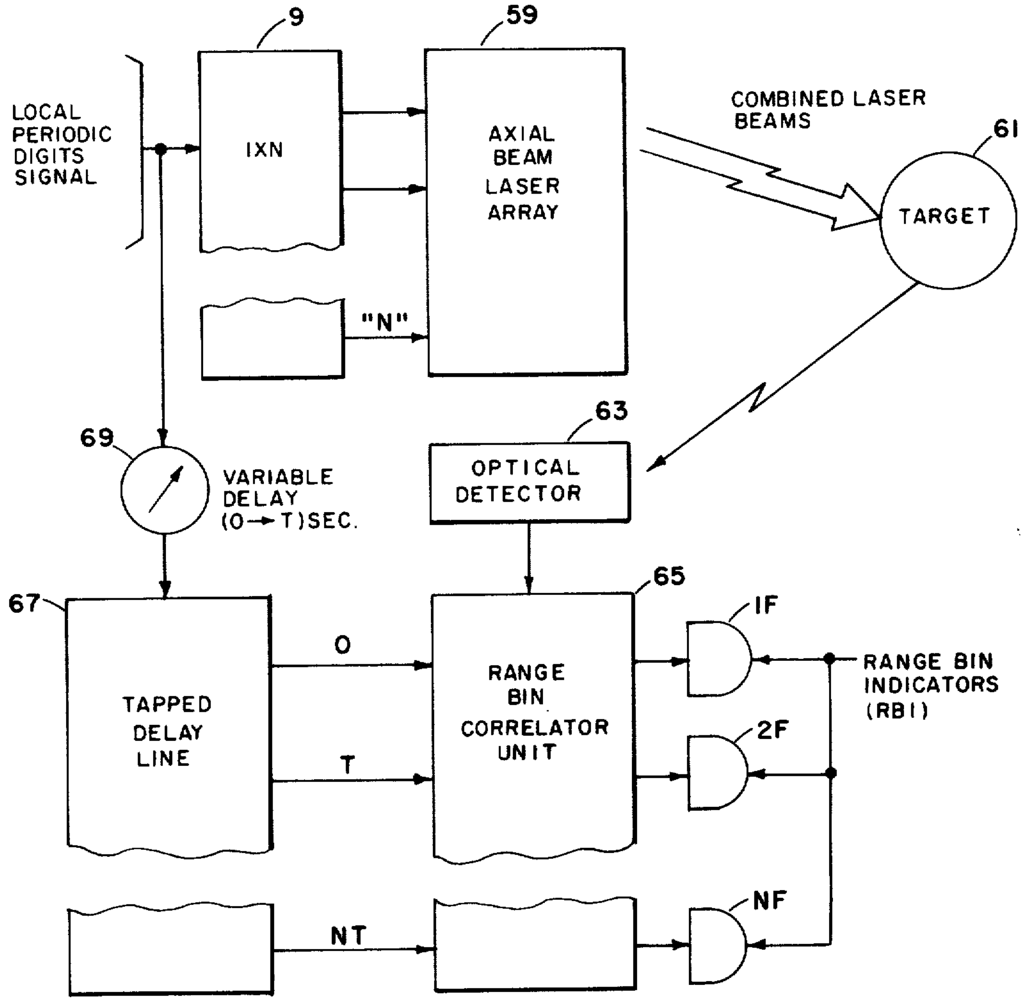
FIG. 14 is a block diagram showing the optical radar embodiment of the present invention.

The diagram of FIG. 14 illustrates the ensemble of equipment to make up an ODAR system. In the upper-left hand corner of the diagram, a local period DIGITS signal (LPDS) is presented to information transformer 9. Assume that LPDS = (1,0,1,1,0,1) and that it is repeated in some fashion such that it is assumed to be periodic.

The outputs of information transformer 9 drives axial beam laser array 59, that in turn, illuminates a target 61 with its laser beams. The illuminated target returns some of this illumination to the ODAR's optical detector 63 which in turn converts it to electrical DIGITS. If all is well, the received periodic DIGITS signal (RPDS) is similar to the LPDS but delayed in time by the round-trip time required by the array-target spacing.

The output of the optical detector is fed to the range bin correlator unit 65 (RBC). The other inputs to RBC unit 65 are taken from a tapped delay line 67. The tap spacing $\tau$ is made equal to the repetition time of a local periodic DIGITS signal consisting of all "ones." If the target assumes a position that corresponds to an intertap time, then the variable delay unit 69 is used to locate it.

The range bin correlator unit 65 has as many range bin indicators 1F-NF (RBI) as are required. Note that a tap is required from delay line 67 for each RBI desired; therefore a plurality of fixed delay units 1K-NK are provided within the tapped delay line 67. The RBI 1F-NF could be lamps.

Figure 15:
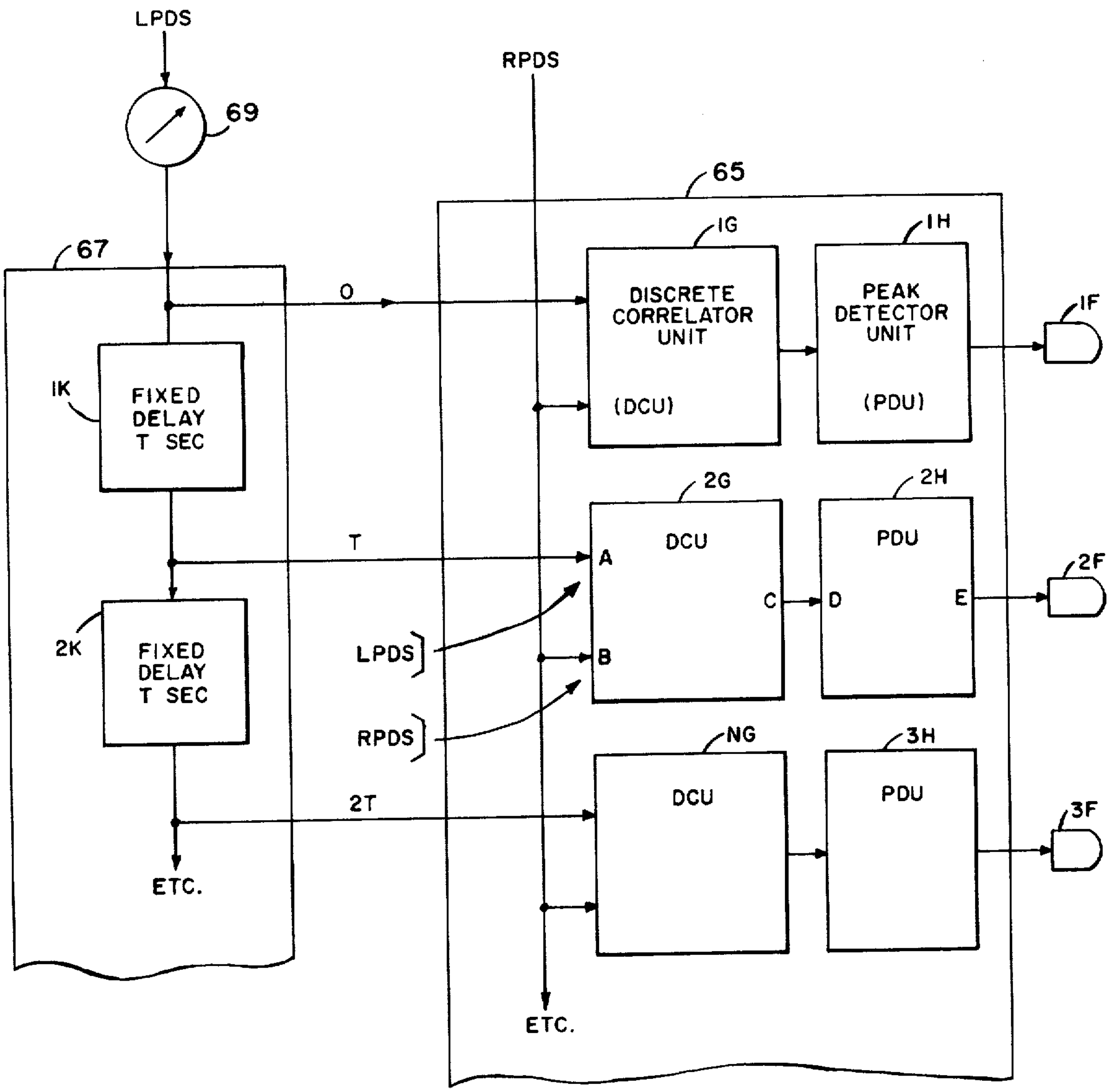
FIG. 15 is a block diagram showing the receiver end of the radar embodiment in greater detail.

FIG. 15 illustrates the RBC unit's make up and operation. At the top of the diagram the LPDS is presented to variable delay 69 and later to tapped delay line 67; while the RPDS is presented to RBC unit 65. RBC unit 65 is made up of a series of discrete correlation units 1G-NG (DCU) followed by peak detector units that is threshold detectors 1H-NH (PDU). The outputs of the RBC unit feeds a series of range bin indicators RBI units 1F-NF.

In FIG. 15 when the target is positioned such that the RPDS signal is present at the B terminal of DCU unit 2G when the LPDS signal is present at its A terminal. At this time the LPDS signal is not present to any other DCU A input. The discrete correlation unit 2G operates on the LPDS and RPDS inputs to form the (1,0,2,2,1,4,1,2,2,0,1) output sequence present at its C output terminal. The peak detector unit 2H detects the present of the "4" in the (1,0,2,2,1,4,1,2,2,0,1) sequence and illuminates its RBI lamp 2F. RBI lamps 1F-NF and the variable delay unit 69 are calibrated in accordance to range so that a direct range readout is available to the operator.

I claim:

1. A system comprising a plurality of optical generating means; a plurality of triggering means individually connected to said plurality of optical generating means to selectively trigger at a discrete optical output therefrom; each of said triggering means having a controlled input; a distributor means having an input and a plurality of outputs; a signal containing digital information being fed to the input of said distributor means; said distributor means sequentially producing a signal at its outputs in accordance with the digital information at its inputs; said plurality of outputs being connected to the inputs of said plurality of triggering means so as to sequentially cause the triggering of said plurality of optical generating means; said plurality of optical generator means are lasers; said signal containing digital information consists of digital signals with a series format; a beam directing means positioned to receive the discrete optical outputs of said lasers; reflecting means in said beam directing means positioned such that the optical output of each laser will follow a single transmission path out of the beam directing means; an optical detector spacially located from said beam directing means and positioned to receive the optical outputs of said beam directing means; a delta modulator having an input and an output; an analog signal being fed to the input of said delta modulator; and said delta modulator producing the digital signal having the series format.

2. A system comprising a plurality of optical generating means; a plurality of triggering means individually connected to said plurality of optical generating means to selectively trigger at a discrete optical output therefrom; each of said triggering means having a controlled input; a distributor means having an input and a plurality of outputs; a signal containing digital information being fed to the input of said distributor means; said distributor means sequentially producing a signal at its outputs in acccordance with the digital information at its inputs; said plurality of outputs being connected to the inputs of said plurality of triggering means so as to sequentially cause the triggering of said plurality of optical generating means; said plurality of optical generator means are lasers; said signal containing digital information consists of digital signals with a series format; said input to the distributor means is a logical digital input which periodically repeats; said optical outputs being directed at a target; optical detector means positioned to detect reflections of the discrete optical outputs of said plurality of generating means from said target; range correlating means connected to receive outputs of said optical detector and the input to said distributor so as to compare the time difference between the two; indicators connected to outputs of the range correlating means so as to indicate said time difference.

3. A system comprising a plurality of optical generating means; a plurality of triggering means individually connected to said plurality of optical generating means to selectively trigger at a discrete optical output therefrom; each of said triggering means having a controlled input; a distributor means having an input and a plurality of outputs; a signal containing digital information being fed to the input of said distributor means; said distributor means sequentially producing a signal at its outputs in accordance with the digital information at its inputs; said plurality of outputs being connected to the inputs of said plurality of triggering means so as to sequentially cause the triggering of said plurality of optical generating means; said plurality of optical generator means are lasers; said signal containing digital information consists of digital signals with a series format; a plurality of optical detectors located spacially from said plurality of optical generator means; said optical detectors being positioned such that they will receive the discrete optical outputs of said plurality of optical generator means; combining means having a plurality of inputs and an output; and outputs from said plurality of optical detectors being connected to the inputs of said combining means.

4. A system as set forth in claim 3 further comprising a first set of delay means connected between the outputs of said optical detectors and the inputs of said combining means.

5. A system as set forth in claim 4 further comprising a second set of delay means connected between the outputs of the distributor means and the inputs of the plurality of triggering means.

6. A system as set forth in claim 5 wherein said first and second set of delay means are variable; first and second controlling means connected to said first and second sets of delay means so as to control the amount of delay of the delay means; and said first and second control means being so related as to produce at the output of the combining means a signal essentially the same as that fed to the input of said distributor means.

* * * * *